United States Patent
Nandagopalan et al.

(10) Patent No.: US 9,137,160 B2
(45) Date of Patent: Sep. 15, 2015

(54) METHOD AND APPARATUS FOR ACCOMODATING A RECEIVER BUFFER TO PREVENT DATA OVERFLOW

(75) Inventors: Saishankar Nandagopalan, San Diego, CA (US); Etienne F. Chaponniere, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 12/403,164

(22) Filed: Mar. 12, 2009

(65) Prior Publication Data

US 2010/0191878 A1    Jul. 29, 2010

Related U.S. Application Data

(60) Provisional application No. 61/148,277, filed on Jan. 29, 2009.

(51) Int. Cl.
*G06F 3/00* (2006.01)
*G06F 5/00* (2006.01)
*G06F 13/42* (2006.01)
*H04L 12/801* (2013.01)
*H04L 12/825* (2013.01)
*H04L 12/835* (2013.01)

(52) U.S. Cl.
CPC .............. *H04L 47/10* (2013.01); *H04L 47/14* (2013.01); *H04L 47/26* (2013.01); *H04L 47/30* (2013.01)

(58) Field of Classification Search
CPC ......... H04L 47/10; H04L 47/14; H04L 47/26; H04L 47/30
USPC ............................................. 710/56, 57, 106
See application file for complete search history.

(56) References Cited

U.S. PATENT DOCUMENTS

| | | | | |
|---|---|---|---|---|
| 4,839,891 | A * | 6/1989 | Kobayashi et al. | 370/231 |
| 5,663,948 | A | 9/1997 | Kobunaya | |
| 5,905,870 | A * | 5/1999 | Mangin et al. | 709/234 |
| 6,965,566 | B2 * | 11/2005 | Kawasaki et al. | 370/235 |
| 7,190,667 | B2 * | 3/2007 | Susnow et al. | 370/229 |
| 7,603,475 | B2 * | 10/2009 | Yang et al. | 709/235 |
| 7,616,567 | B2 * | 11/2009 | Shinagawa et al. | 370/231 |
| 2004/0062200 | A1 * | 4/2004 | Kesavan | 370/235 |

(Continued)

FOREIGN PATENT DOCUMENTS

| | | |
|---|---|---|
| GB | 2378613 | 2/2003 |
| JP | 63065730 A | 3/1988 |

(Continued)

OTHER PUBLICATIONS

3GPP TR 25.999 v7.0.0 (Sep. 2007), Technical Report; 3rd Generation Partnership Project; Technical Specificaction Group Radio Access Network; HSPA Evolution (FDD); (Release 7) Retrieved Oct. 15, 2014, online: <http://3gpp.org>.*

(Continued)

*Primary Examiner* — Eric Oberly
(74) *Attorney, Agent, or Firm* — Donald C. Kordich

(57) ABSTRACT

Methods and apparatuses for preventing overflow at a receiver buffer are provided. Data packets of varying size are received into a receiver buffer and quantified by a byte counter to determine an amount of data in the receiver buffer at a given time. A data capacity status for the receiver buffer is then generated as a function of the amount of data in the receiver buffer.

20 Claims, 10 Drawing Sheets

(56) References Cited

U.S. PATENT DOCUMENTS

| | | |
|---|---|---|
| 2004/0193719 A1 | 9/2004 | Yang et al. |
| 2005/0259651 A1* | 11/2005 | Yashima ............... 370/389 |
| 2007/0097864 A1* | 5/2007 | Bernstein ............... 370/232 |
| 2007/0206519 A1* | 9/2007 | Hansen et al. ............... 370/310 |
| 2007/0237074 A1 | 10/2007 | Curry |
| 2008/0212561 A1* | 9/2008 | Pani et al. ............... 370/346 |
| 2011/0141885 A1* | 6/2011 | Chen ............... 370/229 |

FOREIGN PATENT DOCUMENTS

| | | |
|---|---|---|
| JP | H07327038 A | 12/1995 |
| JP | 11239163 A | 8/1999 |
| JP | 2005142808 A | 6/2005 |
| JP | 2005269033 A | 9/2005 |
| JP | 2005332250 A | 12/2005 |
| JP | 2006054750 A | 2/2006 |
| JP | 2006101428 A | 4/2006 |
| TW | I304481 B | 12/2008 |
| WO | 2008050394 A1 | 5/2008 |
| WO | 2008097544 A2 | 8/2008 |
| WO | WO2008156198 | 12/2008 |
| WO | 2009003786 A1 | 1/2009 |

OTHER PUBLICATIONS

International Search Report & Written Opinion—PCT/US2010/022620, International Search Authority—European Patent Office—Apr. 20, 2010.

Taiwan Search Report—TW099102751—TIPO—Feb. 20, 2013.

* cited by examiner

METHOD AND APPARATUS FOR ACCOMODATING A RECEIVER BUFFER TO PREVENT DATA OVERFLOW

CLAIM OF PRIORITY UNDER 35 U.S.C. §119

The present Application for Patent claims priority to Provisional Application No. 61/148,277 entitled "METHOD AND APPARATUS FOR ACCOMMODATING A RECEIVER BUFFER TO PREVENT DATA OVERFLOW" filed Jan. 29, 2009, and assigned to the assignee hereof and hereby expressly incorporated by reference herein.

BACKGROUND

I. Field

The following description relates generally to wireless communications, and more particularly to methods and apparatuses for receiving data packets of varying size.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), High Speed Packet (HSPA, HSPA+), and others. Moreover, wireless communication systems can be designed to implement one or more standards, such as IS-95, CDMA2000, IS-856, W-CDMA, TD-SCDMA, and the like.

In designing a reliable wireless communication system, special attention must be given to particular data transmission parameters. For instance, so as to avoid data packets being inadvertently lost, a transmitter generally transmits data at a rate that ensures no overflow at the receiver buffer. Current methods and systems generally prevent overflow by simply monitoring the number of packets received at the receiver buffer and communicating this information to the transmitter. For example, if the size of each data packet is a fixed value and the receiver buffer size is known, the transmitter may simply multiply this fixed packet size by the communicated number of packets received, and limit the flow of data accordingly.

For some applications, however, it may be desirable to transmit data packets of varying size. For such applications, since there is no fixed data packet size, simply communicating the number of packets received is insufficient for determining the overflow status of a receiver buffer. Accordingly, it would be desirable to have a method and apparatus for preventing overflow at a receiver buffer where data packets of varying size are transmitted.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with preventing overflow at a receiver buffer. For instance, a method for preventing data overflow in a receiver is provided, which includes receiving data packets of varying size into a receiver buffer. The method further includes monitoring an amount of data in the receiver buffer such that the amount of data is counted by a byte counter. A data capacity status for the receiver buffer is also generated as a function of the amount of data in the receiver buffer.

In another embodiment, a wireless communication apparatus is provided. The apparatus includes means for receiving a stream of data packets of varying size into a receiver buffer having a maximum buffer size. The apparatus further includes means for quantifying an amount of data in the receiver buffer at a given time and means for generating a data capacity status for the receiver buffer. Within this embodiment, the data capacity status is a dynamic metric generated as a function of the amount of data in the receiver buffer at a given time and the maximum buffer size.

In yet another embodiment, a further wireless communications apparatus is provided. For this embodiment, the apparatus includes a receiver unit coupled to a transmitter unit. The receiver unit is configured to receive a stream of data packets of varying size into a receiver buffer. The receiver unit includes a byte counter configured to quantify an amount of data in the receiver buffer at a given time. The transmitter unit is configured to transmit a data capacity status for the receiver buffer in which the data capacity status is a dynamic metric generated as a function of the amount of data in the receiver buffer at a given time.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
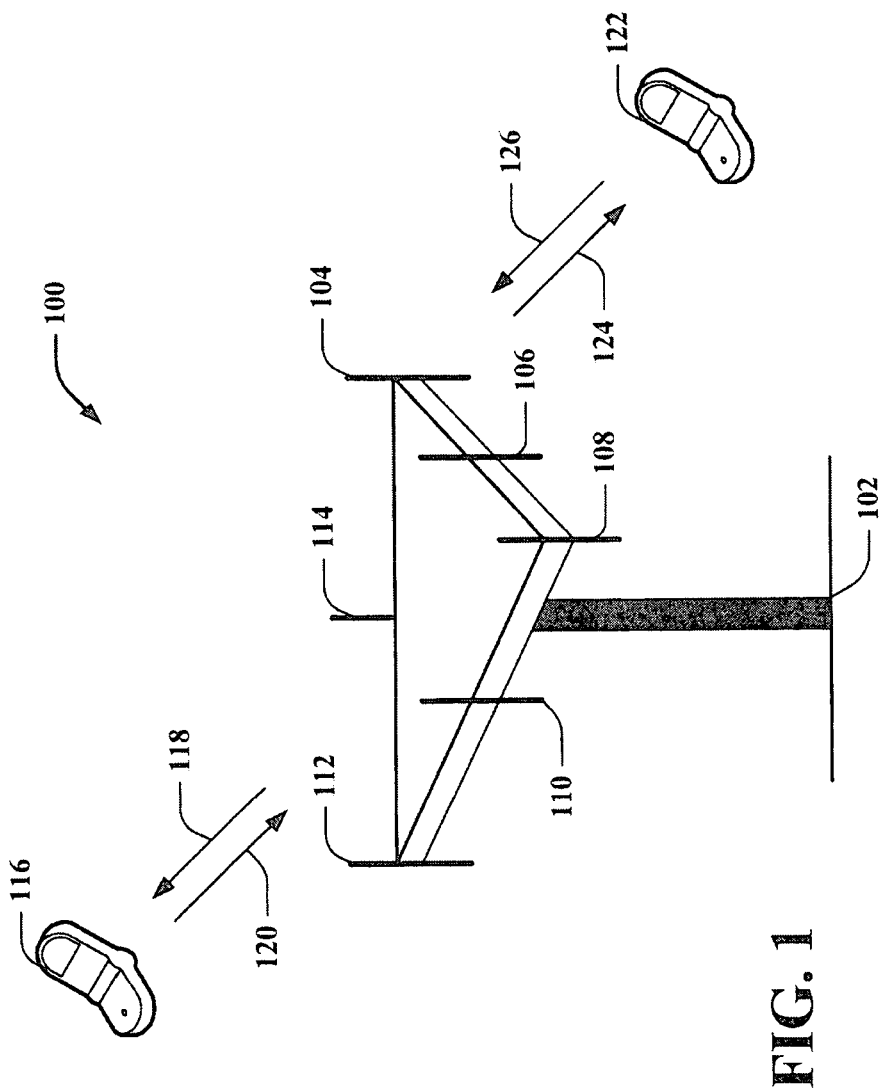
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g. processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

The claimed subject matter in accordance with an aspect provides architectures and methodologies for preventing data overflow in a receiver buffer receiving data packets of varying size.

Figure 2:
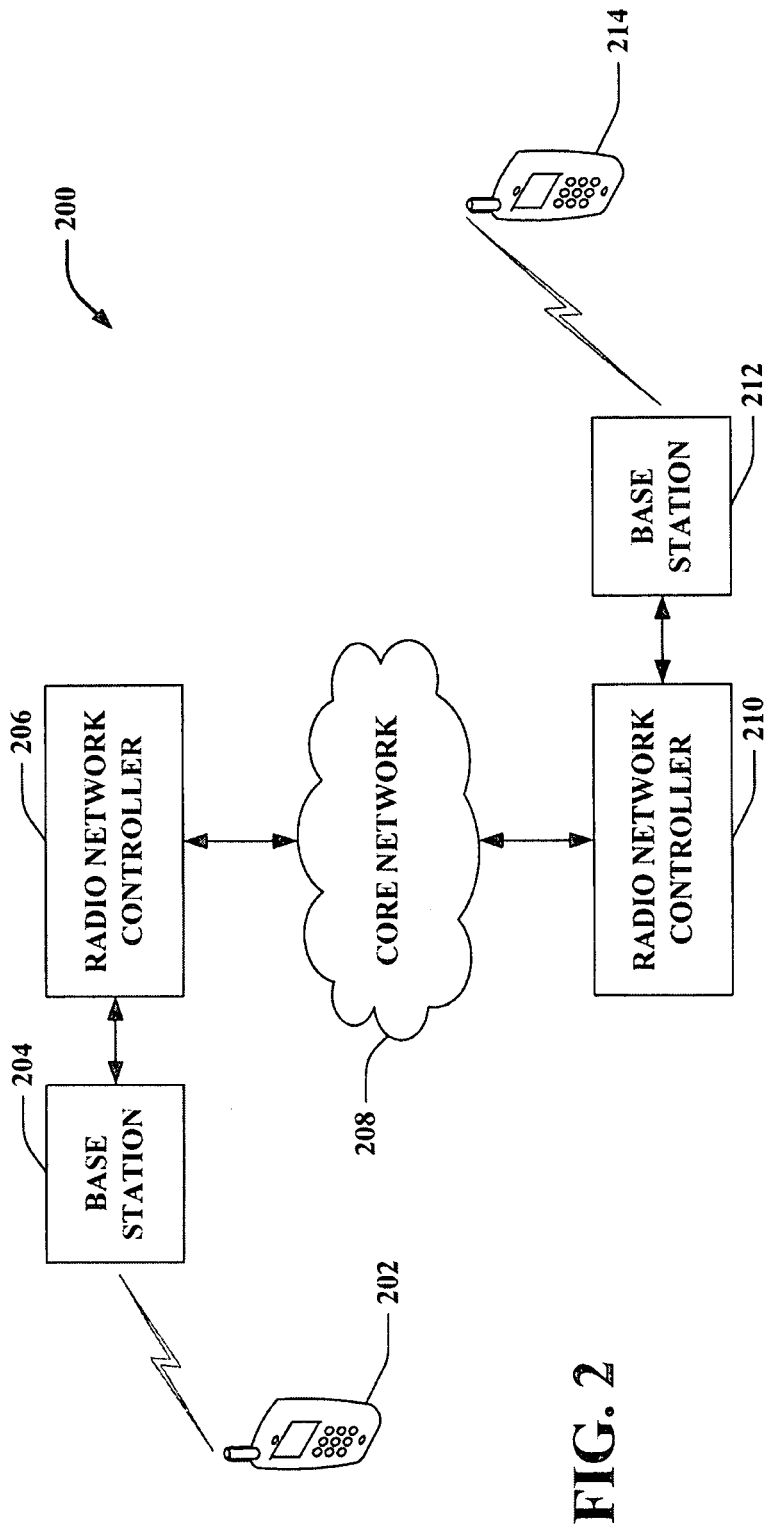
FIG. 2 is an illustration of an exemplary system for preventing data overflow in a wireless communication environment.

Turning now to FIG. 2, an illustrative network architecture 200 is provided that, in accordance with an aspect, facilitates preventing data overflow in a receiver buffer. As illustrated system 200 can include access terminal 202 that can be in continuous and/or operative or sporadic and/or intermittent communication with base station 204 and/or with the greater cellular system or core network 208 (e.g., $3^{rd}$ Generation (3G) cellular systems) through facilities and functionalities provided by radio network controller 206. Access terminal 202, as exemplified above in context with access terminals 116 and 122, can be implemented entirely in hardware and/or a combination of hardware and/or software in execution. Further, access terminal 202 can be incorporated within and/or be associated with other compatible components. Additionally, access terminal 202 can be, but is not limited to, any type of machine that includes a processor and/or is capable of effective communication with core network 208. Illustrative machines that can comprise access terminal 202 can include desktop computers, cellular phones, smart phones, laptop computers, notebook computers, Tablet PCs, consumer and/or industrial devices and/or appliances, hand-held devices, personal digital assistants, multimedia Internet mobile phones, multimedia players, and the like.

Further as depicted, network architecture 200 can also include base station 204 that can provide improved interoperability between the cellular core network and local area IEEE 802 based networking (wired and/or wireless) environments typical in home and/or business environments, for instance. Moreover, base station 204 can provide for cellular system and/or network coverage extension to home or small enterprise networks, for example, and affords peak cellular throughput rates for individual users of a cellular network environment.

Additionally as exemplified in FIG. 2, network architecture 200 can further include radio network controller 206 that can be responsible for control of a set of one or more base stations (e.g., base station 204) which can be connected to, or grouped by, radio network controller 206. Radio network controller 206 typically carries out radio resource management (e.g., strategies and algorithms for controlling parameters such as transmit power, channel allocation, handover criteria, modulation scheme, error coding scheme, etc.), and some of the mobility management functions (e.g., keeping track of where access terminals/user equipment 202 is so that calls, text messaging through the short messaging service (SMS), and other disparate mobile services can be delivered to them). Moreover, radio network controller 206 is typically the point where encryption can be done before user data is sent to and from the access terminal/user equipment 202. Radio network controller 206 generally connects circuit switched core networks (e.g., core network 208) through media gateway servers (MGW) and/or mobile switching centers (MSC) to serving GPRS support nodes (SGSNs) (not shown) that can be responsible for delivery of packets from and to the access terminals/user equipment 202 situated within a particular geographical service area.

Additionally, network architecture 200, as alluded to above, can include core network 208 that can be a circuit switched network. Circuit switched networks typically are ones that establish fixed bandwidth circuits or channels between nodes and/or terminals (e.g., between access terminal/user equipment 202 and access terminal/user equipment 214) before users can communicate. Circuit switching provides the perception (e.g., by providing a constant or consistent bit delay) that the nodes and/or terminals are physically connected with one another via an electrical circuit. This is in contrast to packet switching, where factors such as packet queuing can cause varying delays leading to jitter, especially in the context of voice transmissions.

Furthermore as illustrated, network architecture 200 can additionally include radio network controller 210, base station 212, and access terminal/user equipment 214. Because much of the configuration and operation of the aforementioned components is substantially similar to those described with respect to access terminal/user equipment 202, base station 204, and radio network controller 206 explicated above, a detailed description of such features and functionalities has been omitted to avoid needless prolixity and for the sake of brevity and conciseness.

Figure 3:
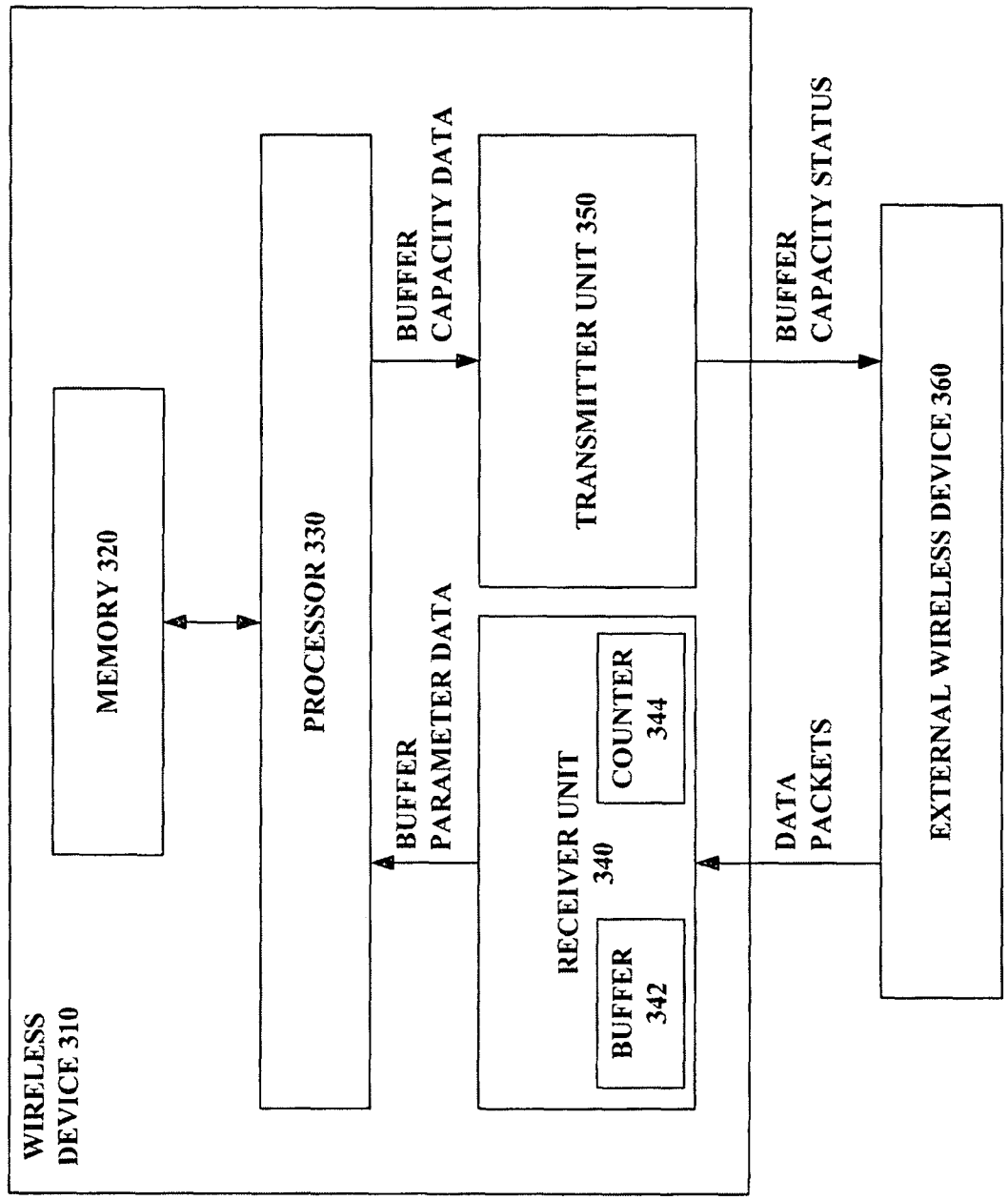
FIG. 3 is a block diagram of a wireless device communicating with an external device in accordance with various aspects of the subject disclosure.

Referring next to FIG. 3, a block diagram of an exemplary wireless communication system 300 in accordance with various aspects of the subject disclosure is provided. As illustrated, system 300 includes wireless device 310 communicating with external wireless device 360. Within such embodiment, wireless device 310 receives data packets of varying size from external wireless device 360 via receiving unit 340. In an embodiment, receiver unit 340 further includes receiver buffer 342 and byte counter 344 such that the received data packets propagate in and out of receiver buffer 342, and such that the accumulated amount of data within receiver buffer 342 at any given time is monitored by byte counter 344. In another embodiment, the individual sizes of each data packet can also be monitored by byte counter 344.

Parameterized buffer data, which may include the accumulated amount of data monitored by byte counter 344 and/or any metric related to the data monitoring of receiver buffer 342, is then sent to processor 330 as shown. Processor 330 may then store this data in memory 320 for later use and/or process this data so as to generate data capacity data for receiver buffer 342. Here, it should be appreciated that processor 330 may generate such data capacity data as a function of parameterized buffer data and/or other data stored in memory 320. Such data may, for example, include a static/dynamic data usage threshold for receiver buffer 342, which may require obtaining data/algorithms stored in memory 320.

Once the data capacity data of buffer 342 is ascertained, this data is provided to transmitter unit 350 where it is subsequently forwarded as a data capacity status to external wireless device 360. Here, it should be appreciated that the data capacity data provided to transmitter 350 may further include instructions/rules obtained from memory 320 as to how/when to forward the data capacity status to device 360. For instance, such instructions/rules may require that the status be sent at periodic intervals and/or only when the data usage of receiver buffer 342 exceeds a particular threshold. Upon receiving the data capacity status of receiver buffer 342, device 360 may then control the flow of data packets transmitted to device 310 accordingly.

Figure 4:
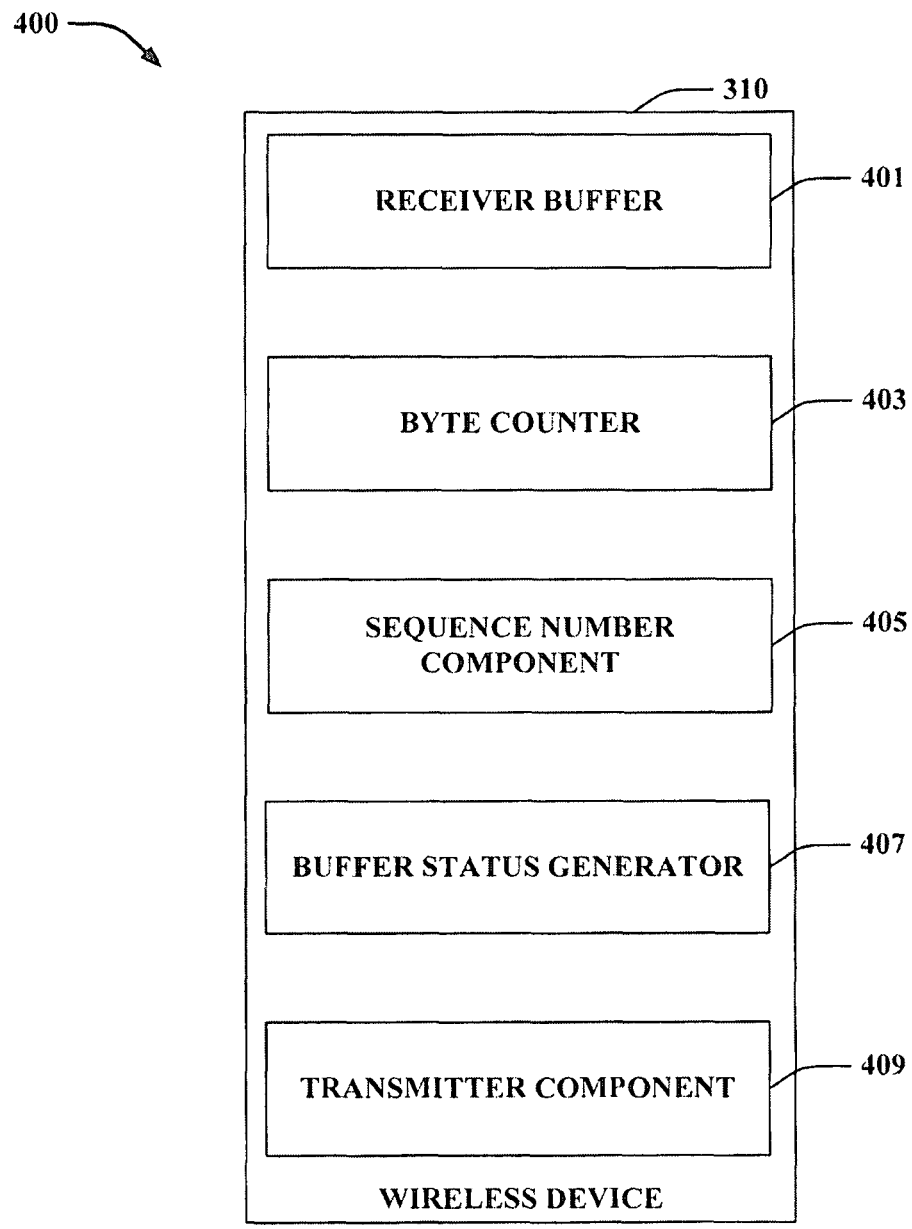
FIG. 4 is an illustration of an exemplary wireless device that effectuates preventing data overflow in accordance with various aspects of the subject disclosure.

Referring next to FIG. 4, an illustration of an exemplary wireless device that effectuates preventing data overflow is provided. Moreover, various components of wireless device 310. As illustrated, wireless device 310 includes receiver buffer 401, byte counter 403, sequence number component 405, buffer status generator 407, and transmitter component 409.

In an embodiment, receiver buffer 401 has a finite storage capacity measurable in bytes. Data packets received by wireless device 310 are initially stored in buffer 401 before being passed to other components of device 310. Because the received data packets are of varying size, the usage capacity of receiver buffer 401 may similarly vary. As such, it is desirable to carefully monitor the actual amount of data in buffer 401 so as to avoid overflow, which may result in lost data packets.

In one aspect, byte counter 403 is used to monitor the usage capacity of buffer 401. In one embodiment, byte counter 403 is coupled to buffer 401 and configured to quantify such usage by summing the bytes of data entering buffer 401 and subtracting the bytes of data exiting buffer 401. In another embodiment, byte counter 403 may be used to log the individual sizes of packets entering/exiting buffer 401 for calibration and/or queuing purposes.

In another aspect, byte counter 403 works together with sequence number component 405 to help control the usage of buffer 401. Sequence number component may, for example, actuate provision of sequence numbers associated with speech frames by conveying to buffer 401 the radio link control (RLC) layer sequence number, or dispatching to buffer 401a new sequence number introduced into the packet data convergence protocol (PDCP) protocol data unit (PDU).

As illustrated, device 310 may also further include buffer status generator 407 and transmitter component 409. In an embodiment, generator 407 and transmitter component 409 work together so as to provide an external device with an accurate assessment of the flow of data packets through buffer 401. Within such embodiment, the buffer status forwarded to the external device may include any of a plurality types of data (e.g., percentage usage, available space, etc.) and could be transmitted according to any of plurality of criteria (e.g., fixed time intervals, threshold usage, etc.).

Figure 5:
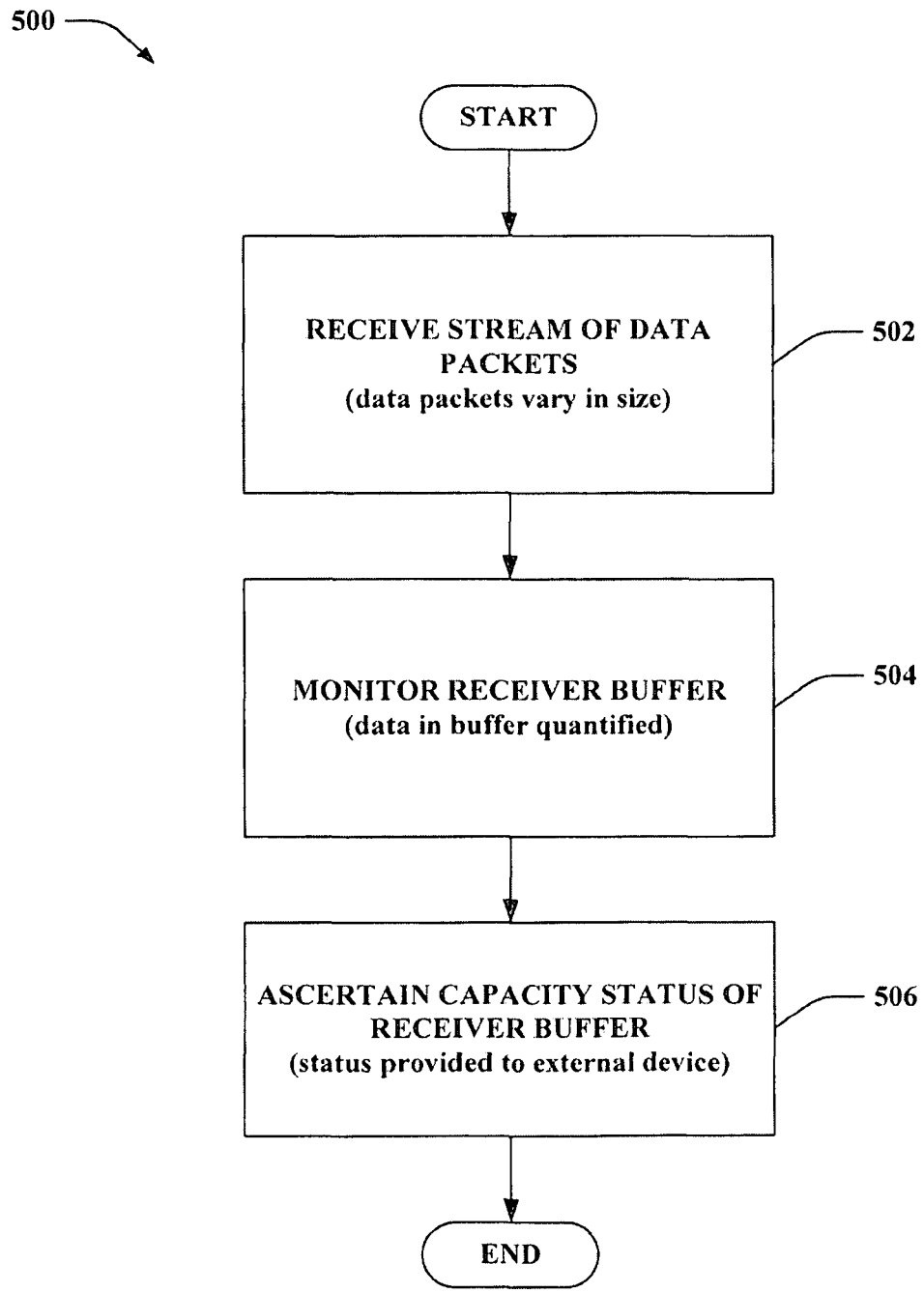
FIG. 5 is an illustration of an exemplary methodology that facilitates preventing data overflow in a wireless communication environment.

Referring next to FIG. 5, an illustration of an exemplary methodology that facilitates preventing data overflow in a wireless communication environment is provided. As illustrated, methodology 500 begins at step 502 where a stream of data packets of varying size are received into a receiver buffer. In one embodiment, it should be appreciated that the entity transmitting the data packets is a UE configured in a flexible RLC PDU size and the receiving entity is an RLC at Node B or at RNC (i.e., reverse link transmission). In another embodiment, however, the entity transmitting the data packets is the RLC at RNC or Node B and the receiving entity is the UE (i.e., forward link transmission).

Next, methodology 500 continues at step 504 where the amount of data in the receiver buffer is monitored. As stated previously, because the data packets received are of varying size, it is more desirable to quantify the actual bytes being used by the receiver buffer than to simply know the number of packets in the receiver buffer. As such, in one embodiment, a byte counter is coupled to the receiver buffer and configured to ascertain the number of bytes being utilized in the receiver buffer at a given time. And because the receiver buffer receives streams of data packets that may continuously enter/exit the buffer, the byte counter may be configured to count bytes continuously and/or at a particular interval.

At step 506, the capacity status of the receiver buffer is then ascertained. Here, because any of a plurality of receiver buffer metrics may be desired, the capacity status generated at step 506 may likewise include any of a plurality of types of data.

As stated previously, such data may include the percentage usage of the receiver buffer and/or the amount of storage space available in the receiver buffer. This capacity status data may then be sent to an external wireless device to determine the flow of data that may be sent without overflowing the receiver buffer.

Figure 6:
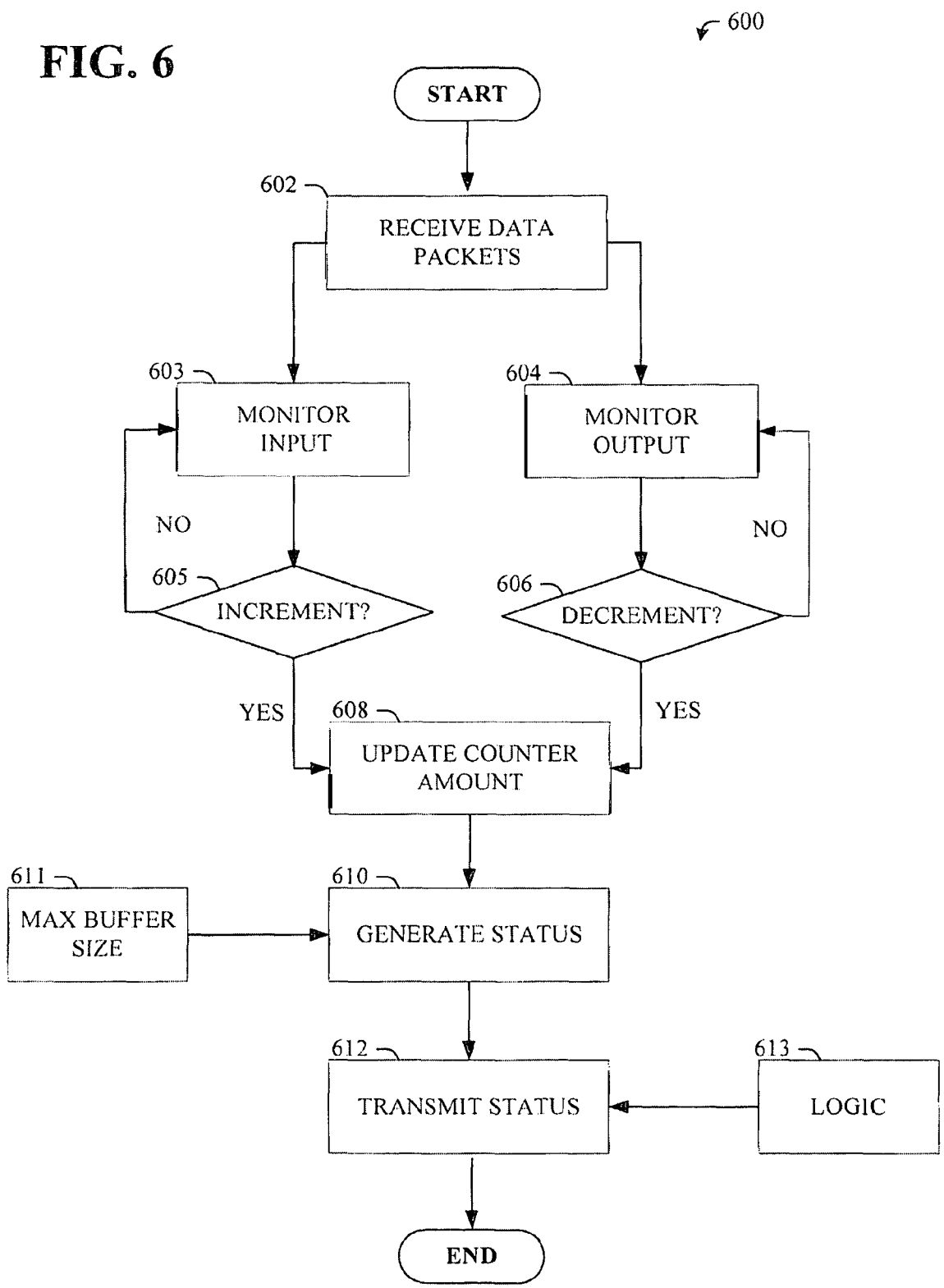
FIG. 6 is a flow chart illustrating an exemplary methodology for receiving a stream of data packets of varying size.

Referring next to FIG. 6, a flow chart illustrating an exemplary methodology for receiving a stream of data packets of varying size is provided. As illustrated, process 600 begins at step 602 where a stream of data packets is received into a receiver buffer. Process 600 then continues with a dual monitoring of the data entering and exiting the receiver buffer. For instance, at step 603, the inputs to the receiver buffer are monitored and subsequently quantified at step 605 by way of incrementing a byte counter. Moreover, the inputs to the receiver buffer are monitored at step 603 to determine whether data packets have been received. If data packets have indeed been received, the byte counter is incremented at step 605, otherwise the process 600 loops back to step 603 where the inputs are again monitored. Similarly, at step 604, the outputs of receiver buffer are monitored and subsequently quantified at step 606 by way of decrementing the byte counter. Namely, if data packets have indeed exited the receiver buffer, the byte counter is decremented at step 606, otherwise the process 600 loops back to step 604 where the outputs are again monitored.

At step 608, process 600 continues by updating the actual counter amount. As illustrated, the actual counter amount reflects the number of bytes being used in the receiver buffer, which is a function of the number of byte increments at step 605 and the number of byte decrements at step 606.

Next, at step 610, a buffer status is provided as a function of the number of bytes being used in the receiver buffer and the actual size of the buffer received at step 611. The buffer status is then transmitted to an external wireless device at step 612 according to logic received at step 613. As stated previously, such logic may include instructions/rules as to when the buffer status should be sent.

Figure 7:
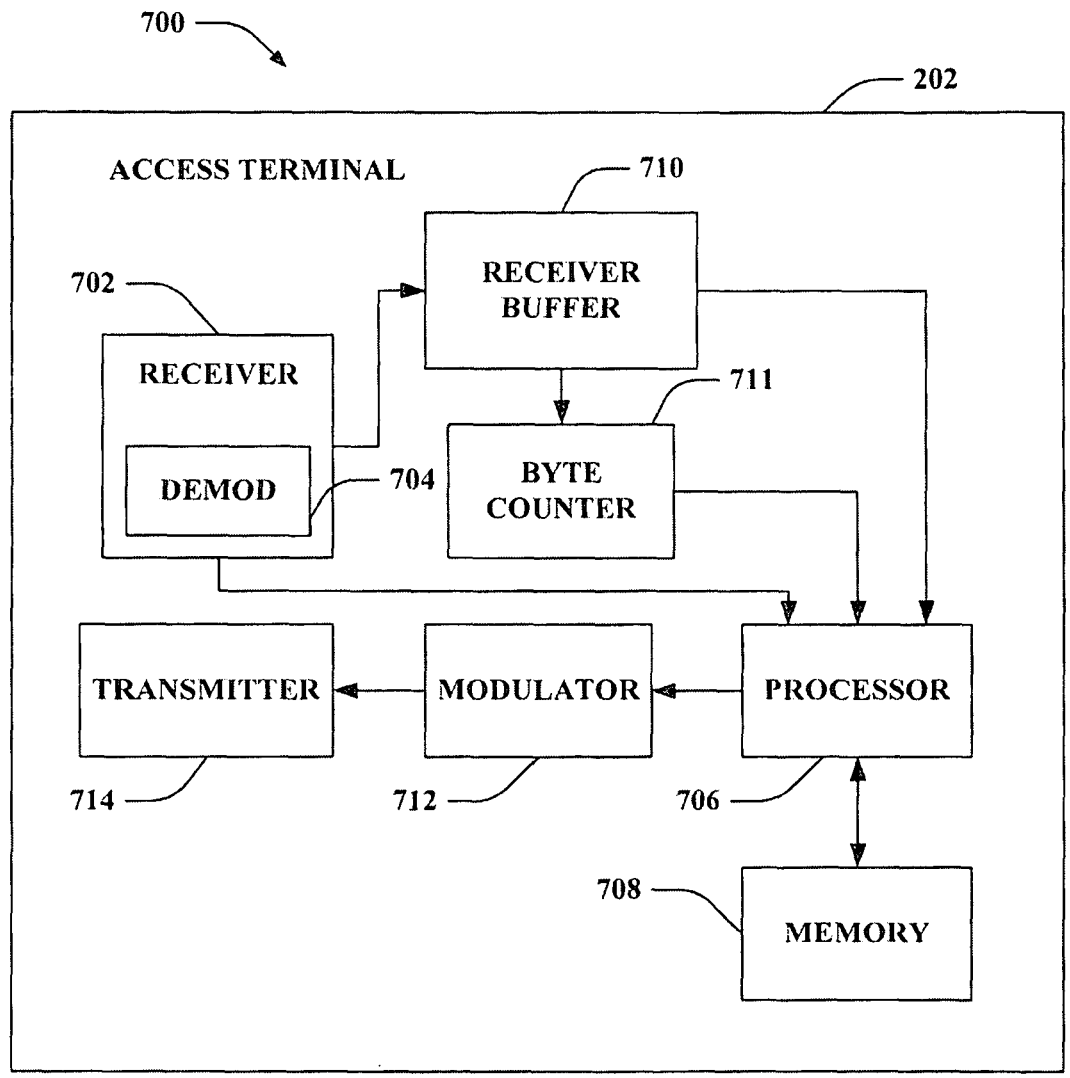
FIG. 7 is an illustration of an exemplary access terminal that effectuates preventing data overflow in a wireless communication system.

FIG. 7 is an illustration 700 of an access terminal 202 that facilitates preventing data overflow. Access terminal 202 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 714, a processor that controls one or more components of access terminal 202, and/or a processor that both analyzes information received by receiver 702, generates information for transmission by transmitter 714, and controls one or more components of access terminal 202.

Access terminal 202 can additionally comprise memory 708 that is operatively coupled to processor 706 and that can store data to be transmitted, received data, and any other suitable information related to performing the various actions and functions set forth herein. For instance, memory 708 can store group-specific signaling constraints employed by one or more base stations. Memory 708 can additionally store protocols and/or algorithms associated with identifying signaling constraints used for communicating resource block assignments and/or employing such signaling constraints to analyze received assignment messages.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to a receiver buffer 710 which can be substantially similar to receiver buffer 401 of FIG. 4. Receiver buffer 710 coupled with byte counter 711, which can be substantially similar to byte counter 403 of FIG. 4, can be employed to facilitate preventing data overflow. Access terminal 202 still further comprises a modulator 712 and a transmitter 714 that transmits the signal to, for instance, a base station, another access terminal, etc. Although depicted as being separate from the processor 706, it is to be appreciated that receiver buffer 710 and/or modulator 712 can be part of processor 706 or a number of processors (not shown).

Figure 8:
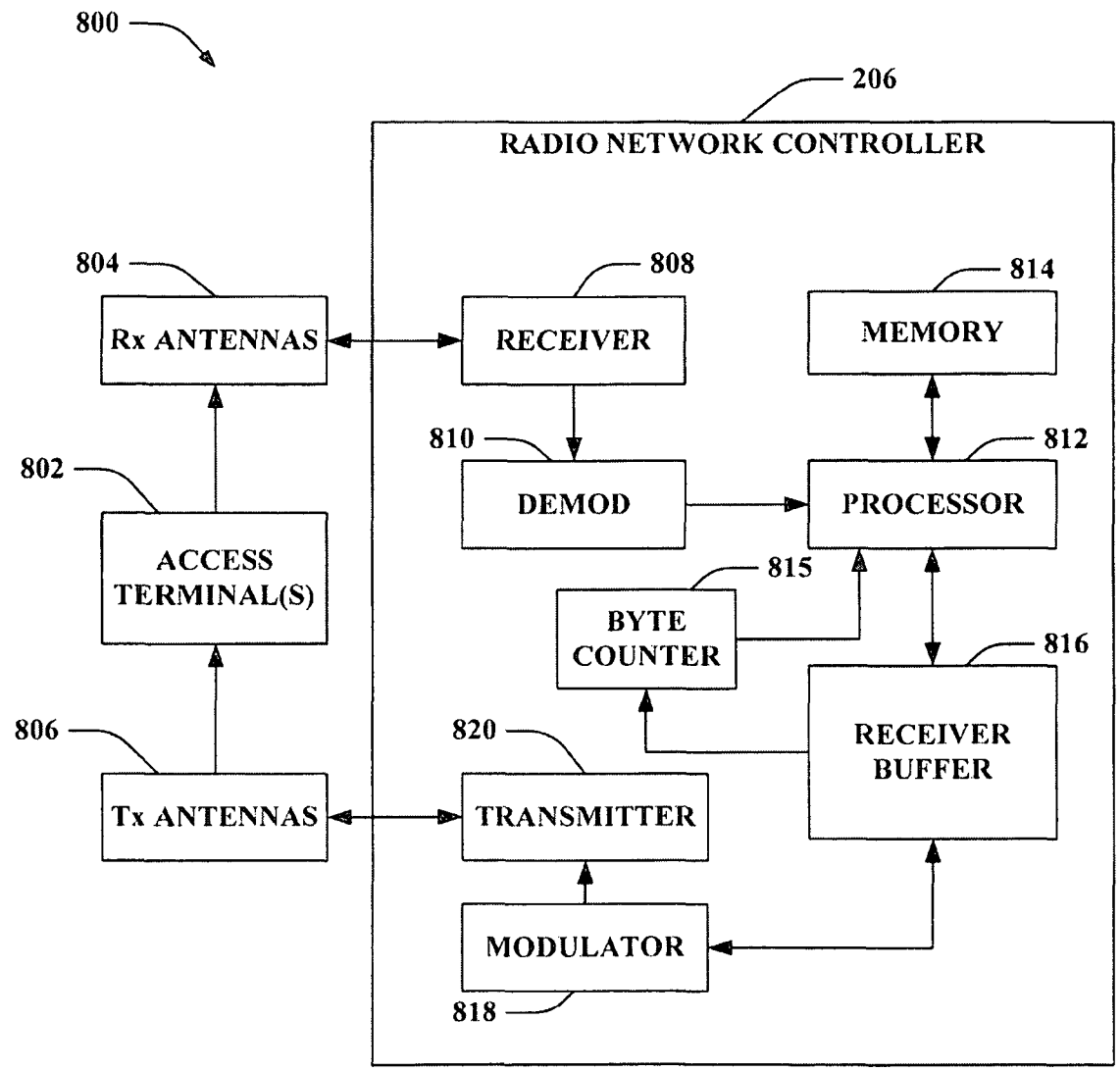
FIG. 8 is an illustration of an exemplary system that effectuates preventing data overflow in a wireless communication environment.

FIG. 8 is an illustration of a system 800 that facilitates preventing data overflow. System 800 comprises a radio network controller 206 (e.g., access point, . . . ) with a receiver 808 that receives signal(s) from one or more access terminals 802 through a plurality of receive antennas 804, and a transmitter 820 that transmits to the one or more access terminals 802 through a transmit antenna 806. Receiver 808 can receive information from receive antennas 804 and is operatively associated with a demodulator 810 that demodulates received information. Demodulated symbols are analyzed by a processor 812 that can be similar to the processor described above with regard to FIG. 7, and which is coupled to a memory 814 that stores data to be transmitted to or received from access terminal(s) 802 (or a disparate base station (not shown)) and/or any other suitable information related to performing the various actions and functions set forth herein. Processor 812 is further coupled to a receiver buffer 816 and byte counter 815 to facilitate preventing data overflow. Further, receiver buffer 816 can provide information to be transmitted to a modulator 818. Modulator 818 can multiplex a frame for transmission by a transmitter 820 through antennas 806 to access terminal(s) 802. Although depicted as being separate from the processor 812, it is to be appreciated that byte counter 815, receiver buffer 816 and/or modulator 818 can be part of processor 812 or a number of processors (not shown).

Figure 9:
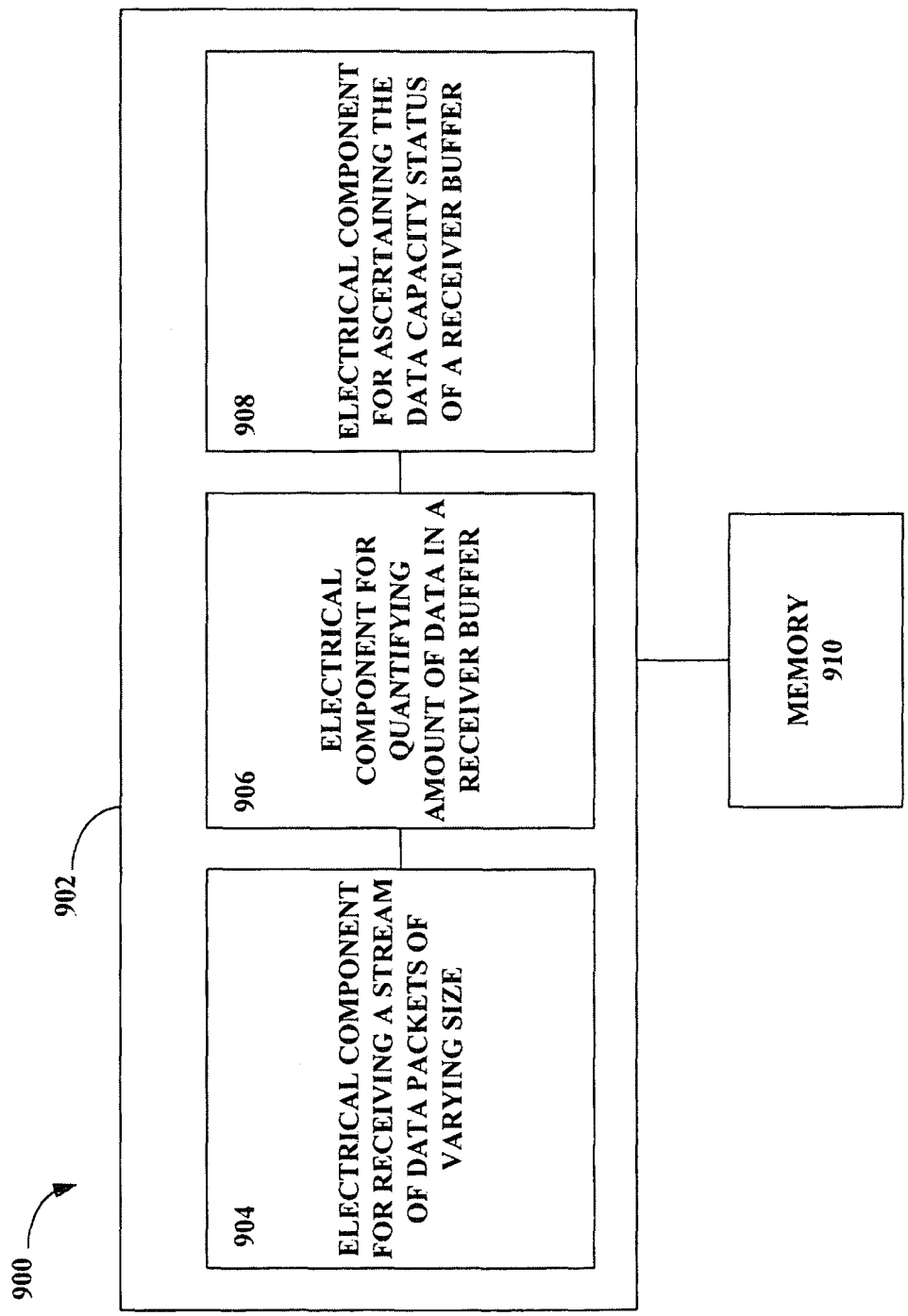
FIG. 9 is an illustration of an exemplary coupling of electrical components that effectuate preventing data overflow in a wireless communication system.

Turning to FIG. 9, illustrated is a system 900 that enables controlling data flow in a wireless communication environment. System 900 can reside within a radio network controller, for instance. As depicted, system 900 includes functional blocks that can represent functions implemented by a processor, software, or combination thereof (e.g., firmware). System 900 includes a logical grouping 902 of electrical components that can act in conjunction. As illustrated, logical grouping 902 can include an electrical component for receiving a stream of data packets of varying size 904. Further, logical grouping 902 can include an electrical component for quantifying the amount of data in a receiver buffer 906. Logical grouping 902 can also include an electrical component for ascertaining the data capacity status of a receiver buffer 908. Additionally, system 900 can include a memory 910 that retains instructions for executing functions associated with electrical components 904, 906, and 908. While shown as being external to memory 910, it is to be understood that electrical components 904, 906, and 908 can exist within memory 910.

Figure 10:
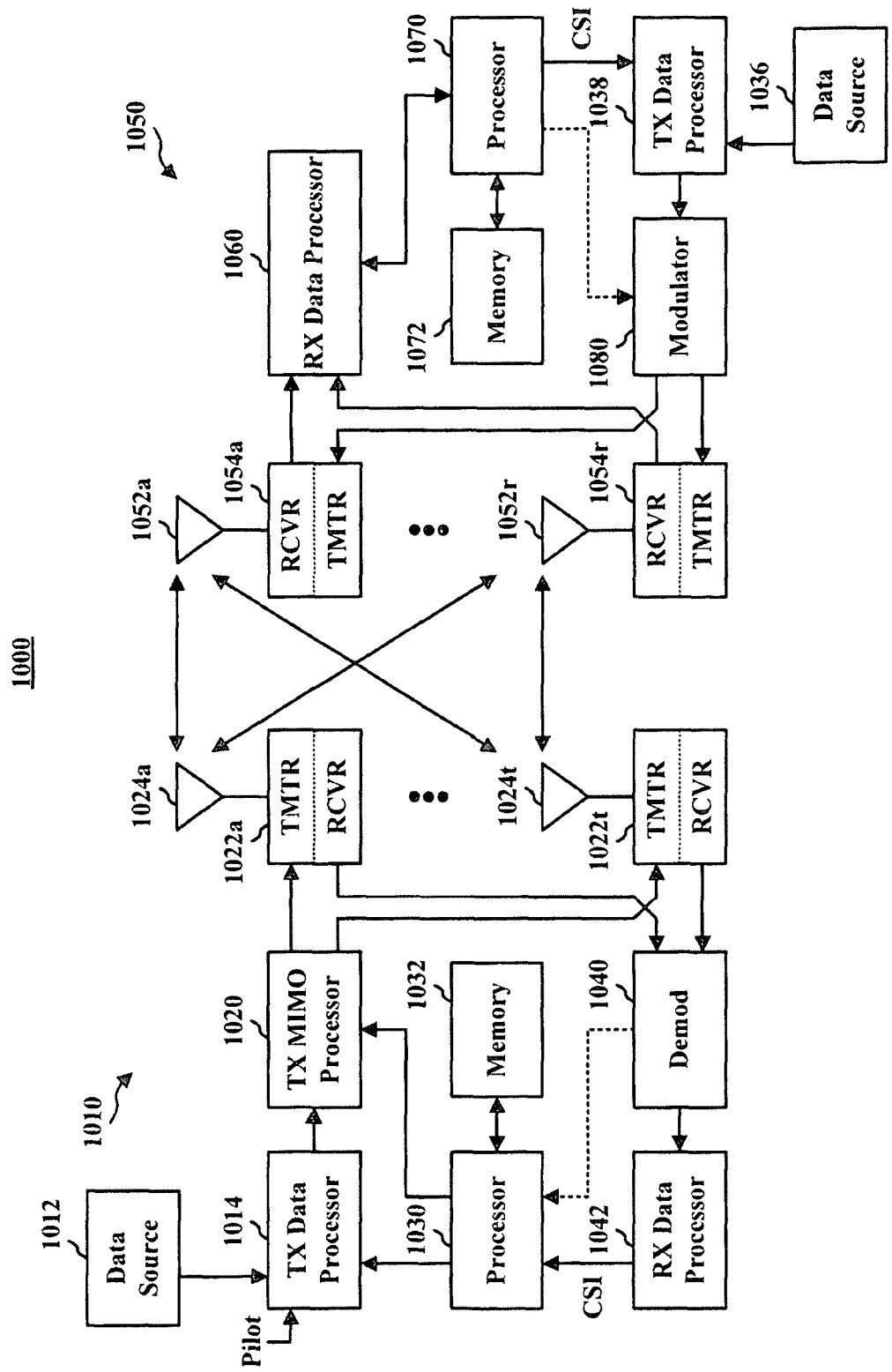
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems and/or methods described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g. for OFDM). TX MIMO processor 1020 then provides $N_T$ modulation symbol streams to $N_T$ transmitters (TMTR) 1022a through 1022t. In various embodiments, rx MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g. filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and, or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ...) by being broadcasted over an entire cell and being mapped to Physical layer (PHY)

resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for preventing data overflow in a multiple-input multiple-output (MIMO) device, comprising:
   receiving, by a plurality of MIMO receivers, a plurality of streams of signals transmitted by a plurality of MIMO transmitters;
   digitizing said plurality of streams of signals to provide a plurality of detected streams of symbols, respectively;
   processing said plurality of detected streams of symbols to generate a stream of data packets;
   receiving said stream of data packets, each of said data packets comprising variable size having no fixed size limit, into a receiver buffer, wherein the receiver buffer has a dynamic data usage threshold;
   monitoring an amount of said data packets in the receiver buffer, the amount of said data packets being counted by a byte counter wherein an accumulated amount of data within the receiver buffer at any given time is monitored by the byte counter;
   generating a data capacity status for the receiver buffer, wherein generating the data capacity status comprises processing parameterized buffer data;
   formulating a reverse link message based on the data capacity status; and
   transmitting the reverse link message to a second MIMO device comprising said plurality of MIMO transmitters, the reverse link message comprising a matrix index portion and a rank value portion for the second MIMO device to determine beamforming weights for said plurality of MIMO transmitters.

2. The method of claim 1, further comprising transmitting the data capacity status to an entity configured to send said data packets to the receiver buffer.

3. The method of claim 2, the data capacity status being transmitted only if the data capacity status exceeds a threshold.

4. The method of claim 2, the data capacity status being transmitted periodically at a set of fixed time intervals.

5. The method of claim 1, the generating step further being a function of a maximum buffer size of the receiver buffer.

6. The method of claim 1, the monitoring step including incrementing the byte counter for each data packet received into the receiver buffer.

7. The method of claim 1, the monitoring step including decrementing the byte counter for each data packet exiting the receiver buffer.

8. A non-transitory computer readable medium comprising computer executable instructions for carrying out the method of claim 1.

9. A wireless communication apparatus that effectuates preventing data overflow in a multiple-input multiple-output (MIMO) device, comprising:
    means for receiving a plurality of streams of signals transmitted by a plurality of MIMO transmitters;
    means for digitizing said plurality of streams of signals to provide a plurality of detected streams of symbols, respectively;
    means for processing said plurality of detected streams of symbols to generate a stream of data packets;
    means for receiving said stream of data packets, each of said data packets comprising variable size having no fixed size limit, into a receiver buffer, wherein the receiver buffer has a dynamic data usage threshold;
    means for monitoring an amount of data in the receiver buffer and monitoring data entering and exiting the receiver buffer;
    means for quantifying an amount of data in the receiver buffer at a given time;
    means for generating a data capacity status for the receiver buffer, wherein the means for generating the data capacity status comprises means for processing parameterized buffer data;
    means for formulating a reverse link message based on the data capacity status; and
    means for transmitting the reverse link message to a second MIMO device comprising said plurality of MIMO transmitters, the reverse link message comprising a matrix index portion and a rank value portion for the second MIMO device to determine beamforming weights for said plurality of MIMO transmitters.

10. The wireless communication apparatus of claim 9, further comprising means for transmitting the data capacity status to an entity configured to send said stream of data packets to the receiver buffer.

11. The wireless communication apparatus of claim 10, further comprising means for determining whether the data capacity status exceeds a threshold, the means for transmitting configured to transmit the data capacity status as a function of whether the data capacity status exceeds a threshold.

12. The wireless communication apparatus of claim 10, the means for transmitting configured to transmit the data capacity status periodically at a set of fixed time intervals.

13. The wireless communication apparatus of claim 9, further comprising means for logging the varying size of each data packet received into the receiver buffer.

14. The wireless communication apparatus of claim 9, the means for quantifying further comprising means for incrementing a byte counter for each data packet received into the receiver buffer.

15. The wireless communication apparatus of claim 9, the means for quantifying further comprising means for decrementing a byte counter for each data packet exiting the receiver buffer.

16. A multiple-input multiple-output (MIMO) wireless communications apparatus, comprising:
    a plurality of MIMO receivers configured to receive a plurality of streams of signals transmitted by a plurality of MIMO transmitters and to digitize said plurality of streams of signals to provide a plurality of detected streams of symbols, respectively;
    a processor configured to process said plurality of detected streams of symbols to generate a stream of data packets;
    a receiver unit configured to receive said stream of data packets, each of said data packets comprising variable size having no fixed size limit, into a receiver buffer, wherein the receiver buffer has a dynamic data usage threshold, the receiver unit comprising a byte counter configured to quantify an amount of data in the receiver buffer at a given time and the byte counter is coupled to the receive buffer and is configured to ascertain a number of bytes being utilized at the receiver buffer; and
    a transmitter unit coupled to the receiver unit, wherein the processor is further configured to formulate a reverse link message based on a data capacity status for the receiver buffer, wherein the data capacity status is generated by processing parameterized buffer data, and wherein the transmitter unit is configured to transmit the reverse link message to a second MIMO device comprising said plurality of MIMO transmitters, the reverse link message comprising a matrix index portion and a rank value portion for the second MIMO device to determine beamforming weights for said plurality of MIMO transmitters.

17. The wireless communications apparatus of claim 16, wherein the receiver unit is further configured to operate as a receiver during a reverse link transmission operation.

18. The wireless communications apparatus of claim 16, wherein the receiver unit is further configured to operate as a receiver during a forward link transmission operation.

19. The wireless communications apparatus of claim 16, the transmitter unit configured to transmit data packets of varying size.

20. The wireless communications apparatus of claim 19, wherein the receiver unit is configured to receive an external data capacity status from another wireless communications apparatus, the transmitter unit configured to transmit the data packets of varying size as a function of the external data capacity status.

* * * * *